United States Patent [19]

Dishong et al.

[11] Patent Number: 5,256,752

[45] Date of Patent: Oct. 26, 1993

[54] NITROGEN-FREE ESTER OF CARBOXY CONTAINING INTERPOLYMERS

[75] Inventors: Dennis M. Dishong, South Euclid; Richard M. Lange, Euclid, both of Ohio

[73] Assignee: The Lubrizol Corporation, Wickliffe, Ohio

[21] Appl. No.: 995,302

[22] Filed: Dec. 22, 1992

Related U.S. Application Data

[63] Continuation of Ser. No. 515,786, Apr. 25, 1990, abandoned, which is a continuation of Ser. No. 30,412, Mar. 25, 1987, abandoned.

[51] Int. Cl.$^5$ ............................................. C08F 220/18
[52] U.S. Cl. ................................. 526/329.5; 525/327.7
[58] Field of Search ..................... 526/329.5; 525/327.7

[56] References Cited

U.S. PATENT DOCUMENTS

| | | | |
|---|---|---|---|
| 2,118,864 | 5/1938 | Reppe et al. | 526/329.5 |
| 2,892,790 | 6/1959 | Stuart et al. | 526/329.5 |
| 3,085,994 | 4/1963 | Muskat | 260/78.5 |
| 3,135,723 | 6/1964 | Vandegaer | 526/329.2 |
| 3,388,106 | 6/1968 | Muskat | 260/78.5 |
| 3,392,155 | 7/1968 | Muskat | 260/78.5 |
| 3,702,300 | 11/1972 | Coleman | 252/51.5 A |
| 3,933,761 | 1/1976 | Coleman | 260/785 |
| 3,956,149 | 5/1976 | Coleman | 252/51.5 A |
| 3,959,159 | 5/1976 | Coleman | 252/51.5 A |
| 4,180,637 | 12/1979 | Evani et al. | 526/204 |
| 4,200,720 | 4/1980 | Evani et al. | 526/233 |
| 4,284,414 | 8/1981 | Bryant | 44/62 |
| 4,604,221 | 8/1986 | Bryant et al. | 252/51.5 A |

FOREIGN PATENT DOCUMENTS

| | | | |
|---|---|---|---|
| 0153209 | 8/1985 | European Pat. Off. | 526/329.5 |
| 59-122509 | 7/1984 | Japan | 526/329.5 |

OTHER PUBLICATIONS

"Copolymer of methyl methacrylate αmethylstyrene-maleic anhydride" Isokawa et al. JP 49/10/56, Mar. 8, 1974.

*Primary Examiner*—Joseph L. Schofer
*Assistant Examiner*—N. Sarofim
*Attorney, Agent, or Firm*—James L. Cordek; Frederick D. Hunter, Sr.; Joseph P. Fischer

[57] ABSTRACT

Nitrogen-free esters of a carboxy-containing interpolymer, wherein the interpolymer has an inherent viscosity ranging from about 0.05 to 1.5 are disclosed. The esters are useful as additives in functional fluids including transmission fluids (both automatic and manual), hydraulic fluids and gear fluids. The transmission, hydraulic and gear fluids containing the esters exhibit improved shear stability while maintaining desired high and low temperature viscosity characteristics.

13 Claims, No Drawings

5,256,752

NITROGEN-FREE ESTER OF CARBOXY CONTAINING INTERPOLYMERS

This is a continuation of copending application Ser. No. 07/515,786 filed on Apr. 25, 1990, now abandoned, which is a continuation of Ser. No. 07/030,412, filed Mar. 25, 1987, now abandoned.

TECHNICAL FIELD OF THE INVENTION

This invention relates to esters of a carboxy-containing interpolymer and to the use of such esters as additives in functional fluids. More particularly, the invention relates to an oil soluble, nitrogen-free mixed ester of a carboxy-containing interpolymer.

BACKGROUND OF THE INVENTION

The problems associated with the lubrication of automatic and manual transmissions and the operation of hydraulic fluid systems are well known to those skilled in the art. For example, in the lubrication of transmissions, proper fluid viscosity at both low and high temperatures is essential to successful operation. Good low temperature fluidity eases cold weather starting and insures that the hydraulic control system will properly "shift gears". Sufficient viscosity at elevated temperatures insures thin film lubrication, pumpability and the satisfactory functioning of converters, valves, clutches, gears and bearings.

In the operation of hydraulic fluid systems, proper fluid viscosity at both low and high temperatures is essential to successful operation. High temperature viscosity retention is beneficial in lubrication, contributes to streamline flow and reduces leakage. Good low temperature fluidity provides rapid control action, less heating loss and lower pressure drop.

These conflicting fluidity requirements call for a product that exhibits the following characteristics:

(A) high temperature viscosity retention;
(B) low temperature fluidity; and
(C) shear stability.

In order to prepare lubricants having these characteristics, it has become common practice to add a variety of chemicals to the oil. For example, in order to meet the viscosity requirements, compositions have been added to the oils which are characterized by relatively small change in their viscosity with changing temperature, and they are commonly graded according to SAE standards according to the viscosities at low (e.g., 0° F.) and at high temperatures (e.g., 210° F.). As a result of the incorporation of such additives, the lubricating oils are often referred to as being "multi-graded". In terms of widely accepted concepts, such multi-graded lubricants have the desirable properties of being able to function at cold temperatures and to continue to function satisfactorily as they become heated during operation.

Although chemical compositions have been developed which improve the viscosity characteristics of lubricating oil, it is often desirable to further improve the low temperature characteristics by including compositions which function as fluidity modifiers at low temperatures. Fluidity modifiers are capable of lowering the viscosity of a lubricating oil at low temperatures generally by retarding the formation of undesirable microcrystalline wax substances.

In addition to the above improvements, it is desirable, if not necessary, that lubricating compositions especially designed for use as transmission fluids, hydraulic fluids, and gear fluids exhibit shear stability. Shear stability means that the lubricating oils will not degrade or lose their desirable viscosity characteristics as a result of the shearing forces encountered during their use. Lubricating oil compositions exhibiting desirable shear stability will be found to generally have the viscosity within 85-100% of their original viscosity after a number of hours, (e.g., 100 hours) of service. It has been recognized that many ordinary viscosity index improvers commonly added to crankcase lubricating oils, such as high molecular weight polyisobutene and polyacrylates do not possess the desired shear stability for use in improving the viscosity characteristics of transmission fluids and hydraulic fluids.

It has now been found that multi-grade lubricants exhibiting improved shear stability can be made by utilizing the compositions of the present invention. These lubricants are particularly useful as additives in transmission fluids and hydraulic fluids.

U.S. Pat. No. 3,702,300 issued to Coleman relates to lubricating compositions containing a nitrogen-containing mixed ester of a carboxy-containing interpolymer.

U.S. Pat. No. 3,933,761 issued to Coleman relates to a nitrogen-containing mixed ester of a carboxy-containing interpolymer and lubricants containing the same.

U.S. Pat. No. 3,956,149 issued to Coleman relates to a lubricant or fuel composition containing a nitrogen-containing ester of a carboxy-containing interpolymer.

U.S. Pat. No. 3,959,159 issued to Coleman relates to lubricating compositions containing a nitrogen-containing mixed ester of a carboxy-containing interpolymer.

U.S. Pat. No. 4,284,414 issued to Bryant relates to a crude oil composition containing mixed alkyl esters of a carboxy-containing interpolymer.

U.S. Pat. No. 4,604,221 issued to Bryant et al relates to a Nitrogen-containing ester of a carboxy-containing interpolymer and lubricants containing the same.

U.S. Pat. No. 4,180,637 issued to Evani relates to a process for preparing a low molecular weight carboxy-containing copolymer.

U.S. Pat. No. 4,200,720 issued to Evani relates to a process for preparing a low molecular weight carboxy-containing interpolymer.

SUMMARY OF THE INVENTION

This invention is directed to esters of carboxy-containing interpolymers. The esters of the carboxy-containing interpolymers are neutralized using a metal-containing base. More particularly, the invention relates to an oil soluble, nitrogen-free mixed ester of a carboxy-containing interpolymer. The interpolymer has a reduced specific viscosity of from about 0.05 to about 2.0. The ester is characterized by the presence within its structure of two pendant polar groups. The first pendant group is a relatively high molecular weight carboxylic ester group having at least eight aliphatic carbon atoms in the ester, and the second pendant group is a relatively low molecular weight carboxylic ester group having no more than seven aliphatic carbon atoms in the ester. The molar ratio of the first group to the second group is (1–10):(1).

The esters are useful as additives in various functional fluids including transmission fluids (both automatic and manual), hydraulic fluids and gear fluids. The transmission, hydraulic and gear fluids containing the esters exhibit improved shear stability while maintaining both desired high and low temperature viscosity characteristics.

An object of this invention is to provide a process for producing a nitrogen-free, low molecular weight carboxy-containing interpolymer.

Another object of this invention is to provide an interpolymer with good low temperature properties even at relatively high interpolymer content.

An advantage of the invention is that functional fluids containing the interpolymer have good low temperature properties even at relatively high interpolymer levels.

These and other objects, advantages and features of the present invention will become apparent to those persons skilled in the art upon reading the details of the structure synthesis and usage as more fully set forth below. Reference is made to the accompanying general structural formulae forming a part hereof wherein like symbols refer to like molecular moieties throughout.

DETAILED DESCRIPTION OF THE PREFERRED EMBODIMENTS

Before the present nitrogen-free mixed ester and process for making such are described, it is to be understood that this invention is not limited to the particular esters or processes described, as such compounds and methods may, of course, vary. It is also to be understood that the terminology used herein is for the purpose of describing particular embodiments only, and is not intended to be limiting since the scope of the present invention will be limited only by the appended claims.

The esters of the carboxy-containing interpolymer include two polar groups as follows:

(A) a carboxylic ester group having at least 8 aliphatic carbon atoms in the ester group; and (B) a carboxylic acid group. The ratio of (A):(B) is from (3:1) to (99:1), preferred (5:1) to (49:1), most preferred (19:1).

In a second embodiment of the invention, the ester includes a third group (C) which is a carboxylic ester group having no more than 7 aliphatic carbon atoms in the ester group. When (C) is present, the ratio of (A):(B):(C) is from (50–90):(1–15):(9–47.5), preferred (75–90):(2.5–10):(7.5–2.5), most preferred (85:5:10).

In a third embodiment of the invention, the pendant group (A) is a carboxylic ester group formed from a statistical mixture of alcohols having an average carbon chain length of 6 carbon atoms to 18 carbon atoms, provided the longest carbon chain length in the statistical mixture is no more than 18 carbon atoms.

Ester groups are represented by the formula

C(O)(OR)

and the number of carbon atoms in an ester group is the combined total of the carbon atoms of the carbonyl group and the carbon atoms contained in the (OR) group.

Another important element of the invention is the molecular weight of the carboxy-containing interpolymer. For convenience, the molecular weight is expressed in terms of the "inherent viscosity" of the interpolymer which is a widely recognized means of indirectly expressing the molecular size of a polymeric substance. As used herein, the inherent viscosity is the value obtained in accordance with the formula Inherent viscosity = ln(relative viscosity)/concentration wherein the relative viscosity is determined by measuring, by means of a dilution viscometer, the viscosity of a solution of the interpolymer, usually one gram, in 100 ml. of acetone and the viscosity of acetone at 30°±0.02° C. Concentration is expressed in grams of interpolymer per deciliter of solvent. A more detailed discussion of the inherent viscosity, as well as its relationship to the average molecular weight of an interpolymer, appears in Jan F. Rabek, Experimental Methods in Polymer Chemistry, (1983 Edition) page 126, et seq. (incorporated herein by reference for purposes of describing and disclosing inherent viscosity and means for determining such).

The carboxy-containing interpolymer contemplated in this invention has an inherent viscosity of from about 0.05 to 1.5, preferably from about 0.10 to 0.8, more preferably about 0.10 to 0.25.

The interpolymers are copolymers, terpolymers, and other interpolymers of alpha, beta-unsaturated dicarboxylic acids or derivatives thereof, or mixtures of two or more of any of these, and one or more vinyl aromatic monomers having up to 12 carbon atoms. The derivatives of the dicarboxylic acid are derivatives which are polymerizable with a monoolefinic compound, and as such, may be the esters and anhydrides of the acids. Copolymers of maleic anhydride and styrene are especially suitable.

Suitable alpha, beta-unsaturated dicarboxylic acids, anhydrides or lower alkyl esters thereof useful in the preparation of the interpolymers include those wherein a carbon-to-carbon double bond is in an alpha, beta-position to at least one of the carboxy functions (e.g., itaconic acid, anhydride or lower esters thereof) and preferably, in an alpha, beta-position to both of the carboxy functions of the alpha, beta-dicarboxylic acid, anhydride or the lower alkyl ester thereof (e.g., maleic acid, anhydride or lower alkyl esters thereof). Normally, the carboxy functions of these compounds will be separated by up to 4 carbon atoms, preferably by 2 carbon atoms.

A class of preferred alpha, beta-unsaturated dicarboxylic acid, anhydrides or the lower alkyl esters thereof, includes those compounds corresponding to the formulae:

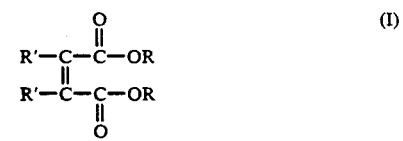 (I)

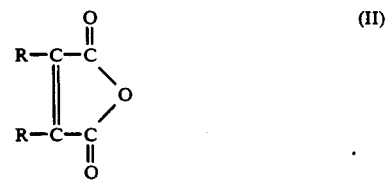 (II)

(including the geometric isomers thereof, i.e., cis and trans) wherein each R' is independently hydrogen; halogen (e.g., chloro, bromo, or iodo); hydrocarbyl or halogen-substituted hydrocarbyl of up to about 8 carbon atoms, preferably alkyl, alkaryl or aryl; (preferably, at least one R' is hydrogen); and each R is independently hydrogen or lower alkyl of up to about 18 carbon atoms (e.g., methyl, ethyl, butyl or heptyl). These preferred alpha, beta-unsaturated dicarboxylic acids, anhydrides or alkyl esters thereof contain a total carbon content of up to about 25 carbon atoms, normally up to about 15 carbon atoms. Examples include maleic anhydride; benzylmaleic anhydride; chloromaleic anhydride; heptyl maleate; citaconic anhydride; ethyl fumarate; fumaric acid; mesaconic acid; ethylisopropyl maleate; isopropyl fumarate; hexyl methyl maleate; phenylmaleic anhydride and the like. These and other alpha, beta-unsaturated dicarboxylic compounds are well known in the art. Of these preferred alpha, beta-unsaturated dicarboxylic compounds, maleic anhydride, maleic acid and fumaric acid and the lower alkyl esters thereof are preferred. Interpolymers derived from mixtures of two or more of any of these can also be used.

Suitable vinyl aromatic monomers of up to about 12 carbon atoms which can be polymerized with the alpha, beta-unsaturated dicarboxylic acids, anhydrides or lower esters thereof are well known. The vinyl aromatic compounds include styrene and substituted styrenes such as alpha-halostyrenes, lower alkyl-substituted styrenes such as para-methylstyrenes, para-tert-butylstyrenes, para-ethylstyrenes, and para-lower alkoxy styrenes and mixtures thereof.

The carboxy-containing interpolymers are obtained by polymerizing alpha, beta-unsaturated acids or anhydrides such as maleic anhydride or itaconic anhydride with olefins (aromatic or aliphatic) such as ethylene, propylene, styrene, or isobutene. The styrene-maleic anhydride interpolymers are especially useful. They are obtained by polymerizing styrene with maleic anhydride at molar ratios from (5:1) to (0.75:1), (2.5:1) to (1:1) being preferred, (1:1) being most preferred.

As an example, a preferred embodiment may be obtained by polymerizing an additional interpolymerizable comonomer with styrene-maleic anhydride. The additional comonomer may be alpha-alkyl styrene, acrylic acid and esters, methacrylic acid and esters, vinyl carboxylates, vinyl ethers, alpha-olefins, isobutylene and diisobutylene. The alpha-alkyl styrene and methacrylic acids and esters are preferred. Alpha-methyl styrene is most preferred. These comonomers are present in relatively minor portions, i.e., less than about 0.3 mole, usually less than 0.15 mole, per mole of either the olefin (e.g. styrene) or the alpha, beta-unsaturated acid or anhydride (e.g. maleic anhydride). The additional interpolymerizable comonomer may be especially useful to improve low temperature properties of the lubricants containing interpolymers of low molecular weight.

The carboxy-containing interpolymers are obtained by polymerization of alpha, beta-unsaturated acids, anhydrides or esters thereof, with vinyl aromatic monomers. The temperature range for the reaction is from the melting point of the reactants to the decomposition temperature of the components, preferably from about 40° C. to about 150° C. The alpha, beta-unsaturated acid or anhydride is heated from ambient temperature to the reaction temperature. One-half of the free radical initiator is added at the reaction temperature. The remainder of the free radical initiator and the vinyl aromatic monomer are added dropwise over about 20 to 180 minutes. A vacuum, about 30 to about 760 torr, is used to control the reaction temperature by effecting reflux. The total time of polymerization is from about 4 to about 8 hours.

The process for use with the interpolymerizable comonomers may be essentially the same as above. The interpolymerizable comonomer may be mixed with the initiator, vinyl aromatic monomer or alpha, beta-unsaturated acid or anhydride solutions.

The following examples are provided so as to provide those of ordinary skill in the art with a complete disclosure and description how to make the compounds and compositions of the invention and are not intended to limit the scope of what the inventors regard as their invention. Efforts have been made to insure accuracy with respect to numbers used (e.g., amounts, temperature, etc.) but some experimental errors and deviation should be accounted for. Unless indicated otherwise, parts are parts by weight, temperature is in degrees C., and pressure is at or near atmospheric. Inherent viscosity is in deciliter per grams, usually abbreviated $dLg^{-1}$.

EXAMPLE A-1

Heat 490 parts of maleic anhydride and 5000 parts of toluene to 100° C. Prepare an initiator solution by mixing 2.13 parts of benzoyl peroxide and 500 parts of toluene. One-half of this solution is to be added all at once. Add 520 parts styrene and the remaining initiator solution dropwise over 40 minutes. Maintain the reaction temperature at 100° C. for 4 hours. The interpolymer obtained should have an inherent viscosity at 30° C. (1 gram/100 mls acetone) of about 0.30 $dLg^{-1}$.

EXAMPLE A-2

Heat 490 parts of fumaric acid and 5000 parts of toluene to 100° C. Prepare an initiator solution by mixing 4.25 parts of benzoyl peroxide with 500 parts of toluene. One-half of the initiator solution is to be added to the fumaric acid and toluene solution at 100° C. Add 520 parts of styrene and the remainder of the initiator solution dropwise over 40 minutes. Maintain temperature at about 100° C. for 4 hours by applying a vacuum to affect reflux. The interpolymer obtained should have an inherent viscosity of 0.23 $dLg^{-1}$.

EXAMPLE A-3

Mix and heat 490 parts of maleic anhydride and 5000 parts of xylene to 100° C. Prepare an initiator solution by mixing 17 parts of 70% benzoyl peroxide with 500 parts of xylene. Add the initiator solution in one portion at 100° C. Apply a vacuum to affect reflux. At 100° C. add 520 parts of styrene over 20 minutes. The reaction is very exothermic. Maintain the reaction temperature at 100° C. for 4 hours after the addition is completed. The interpolymer obtained should have an inherent viscosity of 0.15 $dLg^{-1}$.

EXAMPLE A-4

Mix and heat 490 parts of maleic anhydride and 6900 parts of toluene to 100° C. Prepare an initiator solution by mixing 14.3 parts of 70% benzoyl peroxide and 500 parts of toluene. Add one-half of the initiator solution to the maleic anhydride and toluene at about 100° C. Charge the remainder of the initiator solution and a mixture of 494 parts of styrene, 29.5 parts of alpha-methyl styrene and 25 parts of methyl methyacrylate dropwise over 90 minutes. Apply a vacuum to obtain reflux at 100° C. Maintain the reaction temperature at 100° C. for 4 hours. The interpolymer obtained should have an inherent viscosity of 0.14 $dLg^{-1}$.

EXAMPLE A-5

Mix and heat 490 parts of maleic anhydride and 6900 parts of toluene to 100° C. Prepare an initiator solution by mixing 14.3 parts of 70% benzoyl peroxide with 500 parts of toluene. Add one-half of the initiator solution to the maleic anhydride/toluene mixture. Apply a vacuum to obtain reflux at 100° C. Add the remainder of the initiator solution and a mixture of 494 parts of styrene and 59 parts of alpha-methyl styrene dropwise over 90 minutes. Maintain the reaction temperature at 100° C. for 4 hours. The interpolymer obtained should have an inherent viscosity of 0.15 dLg$^{-1}$.

EXAMPLE A-6

Using the same procedure as described in Example A-5, polymerize 490 parts of fumaric acid with 520 parts of styrene and 29.5 parts of alpha-methyl styrene. Use 8.5 parts of benzoyl peroxide as an initiator and 7400 parts of toluene as a solvent. The interpolymer obtained should have an inherent viscosity of 0.20 dLg$^{-1}$.

EXAMPLE A-7

Utilizing the same procedure as described in Example A-5, polymerize 490 parts of maleic anhydride with 520 parts of styrene and 29.5 parts of alpha-methyl styrene. Use 17 parts of benzoyl peroxide as an initiator and 7400 parts of toluene as solvent. The interpolymer obtained should have an inherent viscosity of 0.17 dLg$^{-1}$.

EXAMPLE A-8

Using the same procedure as described in Example A-5, 490 parts of maleic anhydride is polymerized with 520 parts of styrene and 29.5 parts of alpha-methyl styrene. Use 14.3 parts of 70% benzoyl peroxide along with 7400 parts of toluene. The interpolymer obtained should have an inherent viscosity of 0.14 dLg$^{-1}$.

EXAMPLE A-9

Utilizing the same procedure as described in Example A-5, polymerize 490 parts of maleic anhydride with 520 parts of styrene and 25 parts of methyl methacrylate. Use 4.3 parts of 70% benzoyl peroxide along with 7400 parts of toluene. Add the methyl methacrylate along with the styrene. The interpolymer obtained should have an inherent viscosity of 0.26 dLg$^{-1}$.

EXAMPLE A-10

Utilizing the same procedure as described in Example A-9, polymerize 490 parts of maleic anhydride with 520 parts of styrene and 25 parts of methyl methyacrylate. Use 8.5 parts of benzoyl peroxide along with 7400 parts of toluene. The interpolymer obtained should have an inherent viscosity of 0.13 dLg$^{-1}$.

EXAMPLE A-11

Utilizing the same procedure as described in Example A-9, polymerize 490 parts of maleic anhydride with 520 parts of styrene and 50 parts of methyl methyacrylate. Use 8.5 parts of benzyl peroxide along with 7400 parts of toluene. The interpolymer obtained should have an inherent viscosity of 0.15 dLg$^{-1}$.

EXAMPLE A-12

Heat 490 parts of maleic anhydride and 5000 parts of toluene to 60° C. Prepare an initiator solution by mixing 0.5 parts of Percadox 16 (4-t-butylcyclohexyl peroxy dicarbonate from Noury Chemical Company) and 500 parts of toluene. One-half of this solution is to be added all at once. Add the styrene and the remaining initiator solution dropwise over 40 minutes. Maintain the reaction temperature at 60° C. for 4 hours. The interpolymer obtained should have an inherent viscosity at 30° C. (1 gram/100 mls acetone) of about 1.5 dLg$^{-1}$.

EXAMPLE A-13

Heat 490 parts of maleic anhydride and 5000 parts of toluene to 60° C. Prepare an initiator solution by mixing 1.0 parts of Percadox 16 with 500 parts of toluene. One-half of the initiator solution is to be added to the maleic anhydride and toluene solution at 60° C. Add 520 parts of styrene and the remainder of the initiator solution dropwise over 60 minutes. Maintain temperature at about 60° C. for 4 hours by applying a vacuum to affect reflux. The interpolymer obtained should have an inherent viscosity of 0.8 dLg$^{-1}$.

EXAMPLE A-14

Mix and heat 490 parts of maleic anhydride and 6900 parts of toluene to 60° C. Prepare an initiator solution by mixing 1.0 parts of Pencadox 16 and 500 parts of toluene. Add one-half of the initiator solution to the maleic anhydride and toluene at about 60° C. Charge the remainder of the initiator solution and a mixture of 494 parts of styrene, 29.5 parts of alpha-methyl styrene and 25 parts of methyl methyacrylate dropwise over 90 minutes. Apply a vacuum to obtain reflux at 60° C. Maintain the reaction temperature at 60° C. for 4 hours. The interpolymer obtained should have an inherent viscosity of 0.8 dLg$^{-1}$.

EXAMPLE A-15

Mix and heat 490 parts of maleic anhydride to 60° C. Prepare an initiator solution by mixing 0.5 parts of Pendadox 16 with 500 parts of toluene. Add one-half of the initiator solution to the maleic anhydride/toluene mixture. Apply a vacuum to obtain reflux at 60° C. Add the remainder of the initiator solution and a mixture of 494 parts of styrene and 59 parts of alpha-methyl styrene dropwise over 90 minutes. Maintain the reaction temperature at 60° C. for 4 hours. The interpolymer obtained should have an inherent viscosity of 1.5 dLg$^{-1}$.

The alcohols from which the esters of this invention are prepared include the high molecular weight alcohol having at least 7 aliphatic carbon atoms, e.g., high molecular weight alcohols having from about 7 to about 40 aliphatic carbon atoms and preferably alcohols having from about 7 to 30 aliphatic carbon atoms or from about 8 to 24 aliphatic carbon atoms. Specific examples of the high molecular weight carboxylic-ester groups, i.e., the R group of the ester radical C(O)OR includes heptyl, octyl, nonyl, decyl, undecyl, dodecyl, tridecyl, pentadecyl, octadecyl, eicosyl, tricosyl, tetracosyl, heptacoxyl, triacontyl, hentriacontyl, tetracontyl, etc.

In preparing the mixed esters of the carboxy interpolymers, one or more of the low molecular weight alcohols having from 1 to 6 aliphatic carbon atoms may be used separately or in combination with the high molecular weight aliphatic alcohols. Specific examples of the low molecular weight ester groups, i.e., the R group, include methyl, ethyl, propyl, butyl, pentlyl, hexyl, 2-methylbutyl, 2,3-dimethylbutyl, etc. Although the esters may be prepared from one or more of the high molecular weight aliphatic alcohols, it is also advantageous to prepare a mixed ester from mixtures or a combination of high molecular weight and low molecular weight aliphatic alcohols. Other substituents, i.e., polar substituents, etc., which may be present in the ester radicals of the nitrogen-containing esters in amounts ranging from about 0 to about 10 molar percent may include, for example, the chloro, bromo, ether, nitro, etc. and various combinations thereof. In preparing the mixed esters, the high molecular weight aliphatic alcohol may be used in an amount ranging from about 1.0 to 10 moles of said high molecular weight alcohol for each 1.0 mole of the low molecular weight alcohol. Preferably, however, the mixed esters are prepared from alcohols wherein the high molecular weight aliphatic alcohol is present in an amount ranging from about 2 to 9 moles of said high molecular weight aliphatic alcohol and preferably from about 2.5 to 5.0 moles of said high molecular weight alcohol for each mole of said low molecular weight aliphatic alcohol.

Moreover, one or more of the high molecular weight and one or more of the low molecular weight alcohols may be reacted either alone or in combination. A preferred class of alcohols includes the commercially available mixtures of alcohols. One class of commercial alcohols includes the oxoalcohols which comprises, for example, a mixture of alcohols having from about 8–24 carbon atoms. Of the various commercial alcohols, another preferred class of alcohols includes the alcohols having from about 8 to 30 aliphatic carbon atoms. These alcohol mixtures include a "statistical mix" of alcohols, i.e., a mix of alcohols which vary in carbon chain length in small increments over the range disclosed. The present inventors have found that in some circumstances particularly advantageous results may be obtained by preparing the ester of the interpolymer with such "statistical mix." The alcohols may comprise, for example, heptyl alcohol, octyl alcohol, nonyl alcohol, decyl alcohol, undecyl alcohol, dodecyl alcohol, tetradecyl alcohol, pentadecyl alcohol, eicosyl alcohol, octadecyl alcohol, or mixtures thereof, etc.

The esters of the invention are most conveniently prepared by first esterifying the carboxy-containing interpolymer with the higher molecular weight alcohol or a mixture of the high and low molecular weight alcohols to convert at least about 95% of the carboxy radicals of the interpolymer to ester radicals. When the mixed esters are prepared, the molar ratio of the high molecular weight alcohol to the low molecular weight alcohol used in the process should be within the range of from about 2:1 to about 9:1. In most instances the ratio will be from about 2.5:1 to about 5:1. More than one high molecular weight alcohol or low molecular weight alcohol may be used in the process. Commercial alcohol mixtures (which include statistical mixtures) such as the so-called oxo-alcohols which comprise, for example, mixtures of alcohols having 8 to about 24 carbon atoms also may be used. A particularly useful class of alcohols are the commercial alcohol mixtures or mixtures of commercial alcohol mixtures comprising octyl alcohol, nonyl alcohol, decyl alcohol, undecyl alcohol, dodecyl alcohol, tridecyl alcohol, tetradecyl alcohol, pentadecyl alcohol, hexadecyl alcohol, heptadecyl alcohol and octadecyl alcohol. Commercial alcohol mixtures primarily comprised of tetradecyl and pentadecyl alcohols are particularly useful. Several suitable sources of these alcohol mixtures are the technical grade alcohols sold under the trade-name "Neodols" by Shell Chemical Corporation and under the tradename "Alfols" by Continental Oil Company. Other alcohols useful in the process are illustrated by those which, upon esterification, yield the ester groups exemplified above.

The extent of esterification, as indicated previously, may range from about 85% to about 97% conversion of the carboxy radicals of the interpolymer to ester radicals. In a preferred embodiment, the degree of esterification is about 95%.

The esterification can be accomplished simply by heating the carboxy-containing interpolymer and the alcohol or alcohol mixtures under conditions typical for effecting esterification. Such conditions usually include, for example, a temperature of at least about 80° C., preferably from about 150° C. to about 350° C., provided that the temperature be below the decomposition point of the reaction mixture, and the removal of water of esterification as the reaction proceeds. Such conditions may optionally include the use of an excess of the alcohol reactant so as to facilitate esterification, the use of a solvent or diluent such as mineral oil, toluene, benzene, xylene or the like and an esterification catalyst such as toluene sulfonic acid, sulfuric acid, aluminum chloride, boron trifluoride-triethylamine, hydrochloric acid, ammonium sulfate, phosphoric acid, sodium methoxide, methane sulfonic acid or the like. These conditions and variations thereof are well known in the art.

A particularly desirable method of effecting esterification when mixed esters are desired involves first reacting the carboxy-containing interpolymer with the relatively high molecular weight alcohol and then reacting the partially esterified interpolymer with the relatively low molecular weight alcohol. A variation of this technique involves initiating the esterification with the relatively high molecular weight alcohol and before such esterification is complete the relatively low molecular weight alcohol is introduced into the reaction mass so as to achieve a mixed esterification. In either event it has been discovered that a two-step esterification process whereby the carboxy-containing interpolymer is first esterified with the relatively high molecular weight alcohol so as to convert from about 50% to about 85% of the carboxy radicals to ester radicals and then with a relatively low molecular weight alcohol to achieve the finally desired degree of esterification results in products which have unusually beneficial viscosity properties.

The esterified interpolymer may then treated with a metal-containing base in an amount so as to neutralize the acidic catalyst. Some neutralization of the carboxylic acid groups on the interpolymer may occur. The neutralization is preferably carried out at a temperature of at least 50° C., often from 120° C. to 200° C., provided that the temperature does not exceed the decomposition point of the reaction mass. In most instances the neutralization temperature is between 50° C. and 150° C. A slight excess of the stoichiometric amount of the metal base is often desirable, so as to insure substantial completion of neutralization.

Examples of the alkali metal bases are sodium hydroxide, potassium hydroxide, lithium hydroxide, and the like, preferably sodium hydroxide or potassium hydroxide, most preferably sodium hydroxide. Examples of alkaline earth metal bases are calcium hydroxide, barium hydroxide, magnesium hydroxide, and the like, preferably calcium hydroxide or magnesium hydroxide, most preferably calcium hydroxide. Carbonates of previously mentioned metals may also be used.

The esterified interpolymers of the present invention may be sold by itself or in concentrates, in combination with any other known additive which includes, but is not limited to dispersants, detergents, antioxidants, antiwear agents, extreme pressure agents, emulsifiers, demulsifiers, friction modifiers, anti-rust agents, corrosion inhibitors, viscosity improvers, pour point depressants, dyes, and solvents to improve handleability which may include alkyl and/or aryl hydrocarbons. These additives may be present in various amounts depending on the needs of the final product.

The concentrate might contain 0.01 to 90% by weight of the esters. The esters may be present in a final product, blend or concentrate in (in a minor amount, i.e., up to 50% by weight) any amount effective to act as a viscosity improver but is preferably present in gear oils, oil of lubricating viscosity, hydraulic oils, fuel oils or automatic transmission fluids in an amount of from about 3 to about 30%, preferably 3 to about 15% by weight.

The following examples are described so as to provide those of ordinary skill in the art with a complete disclosure and description how to make the compounds and compositions of the invention and are not intended to limit the scope of what the inventors regard as their invention. Efforts have been made to insure accuracy with respect to numbers used (e.g., amounts, temperature, etc.) but some experimental errors and deviation should be accounted for. Unless indicated otherwise, parts are parts by weight, temperature is in degrees C., and pressure is at or near atmospheric.

EXAMPLE B-1

Charge a vessel with a toluene slurry (870 parts) having 15.5% solids and 84.5% volatiles of the interpolymer of Example A-1 and Alfol 1218 (278 parts). Heat the mixture to 100° C. under nitrogen with medium agitation. Add sulfuric acid (3.1 parts of a 96% solution in water) and 48.7 parts of Alfol 810 to the vessel. Raise the temperature of the mixture to 145° C.-150° C. by removing toluene-water distillate. Add 301 parts of a mineral oil 150° C. Maintain the temperature of the mixture at 145° C.-150° C. for 6 hours. Add 54 parts of a mineral oil to the mixture. Maintain the temperature of the mixture at 145° C.-150° C. until net acid number indicates that esterification is at least 75% complete. Add 26.7 parts of n-butanol dropwise over 15 minutes. Maintain the temperature of the mixture at 145° C.-150° C. for 3 hours. Add solution of sulfuric acid (0.52 parts of a 96% solution) and 26.7 parts of butanol dropwise over 10 minutes. Maintain the temperature of the mixture at 145° C.-150° C. until the net acid number indicates that the esterification is at least 95% complete. Add sodium hydroxide (0.96 parts of a 50% aqueous solution) to the mixture, and add Ethyl Antioxidant 733 (1.36 parts) to the mixture. Vacuum strip the mixture at 155° C. and 5 torr. Add diatomaceous earth (10 parts) to the mixture along with Ethyl Antioxidant 733 (1.36 parts). Cool the mixture to 100° C. and filter through a heated funnel to yield the desired product.

EXAMPLE B-2

Esterify a toluene slurry (928 parts) having 15.5% solids and 84.5% volatiles of the interpolymer of Example A-1 utilizing the same procedure as Example B-1. Use 348 parts Alfol 1218, 61 parts Alfol 810, 4.53 parts of a 96% sulfuric acid solution, 293 parts of a mineral oil, 66.6 parts of butanol, 1.46 parts of Ethyl Antioxidant 733 and 10 parts of diatomaceous earth.

EXAMPLE B-3

Charge to a suitable vessel the interpolymer of Example A-3 (404 parts) and Alfol 1218 (555 parts). Heat the mixture to 100° C. with agitation under nitrogen. Add Alfol 810 (98 parts) and 70% methanesulfonic acid (6.4 parts) to the mixture. Raise the temperature to 150° C. by removal of water-xylene distillate. Maintain the temperature of the mixture at 150° C. until net acid number indicates that esterification is at least 75% complete. Add butanol (104 parts) dropwise to the mixture. Maintain the temperature of the mixture at 150° C. until the net acid number indicates that esterification is at least 95% complete. Add Ethyl Antioxidant 733 (4.6 parts) and sodium hydroxide (2 parts of a 50% aqueous solution) to the mixture. Vacuum strip the mixture at 150° C. and 20 torr. Cool the mixture to 100° C. and add Ethyl Antioxidant 733 (4.6 parts) and diatomaceous earth (36 parts) to the mixture. Filter the mixture through a heated funnel to yield the desired product.

EXAMPLE B-4

Charge to a suitable vessel a toluene slurry (1688 parts) having 12.32% solids and 87.68% volatiles of the interpolymer of Example A-4 Alfol 1218 (257 parts) and mineral oil (130 parts). Heat the mixture to 100° C. with medium agitation under nitrogen. Add sulfuric acid (4.22 parts of a 93% solution) and Alfol 810 (45 parts) to the mixture. Heat the mixture to 150° C. by removing toluene-water distillate. Add butanol (27 parts) to the mixture. Maintain the temperature of the mixture at 150° C. for 1½ hours. Add a second portion of butanol (27 parts) to the mixture. Maintain the temperature of the mixture at 150° C. until the net acid number indicates that esterification is at least 95% complete. Add sodium hydroxide (1.44 parts of a 50% aqueous solution) and Isonox 133 (1.04 parts) to the mixture. Vacuum strip the mixture at 150° C. and 100 torr. Add a second portion of Isonox 133 (1.04 parts) along with diatomaceous earth (16 parts). Cool the mixture to 100° C. and filter through a hot funnel to yield the desired product.

EXAMPLE B-5

Esterify 208 parts of the interpolymer of Example A-5 by the same procedure as Example B-4. Use 257 parts of Alfol 1218, 45 parts of Alfol 810, 130 parts of mineral oil, 4.22 parts of a 93% solution of sulfuric acid, 54 parts of butanol, 1.28 parts of a 50% aqueous solution of sodium hydroxide, 2 parts of Isonox 133 and 16 parts of diatomaceous earth.

EXAMPLE B-6

Esterify 208 parts of the interpolymer of Example A-6 by the same procedure as Example B-4. Use 257 parts of Alfol 1218, 45.2 parts of Alfol 810, 222 parts of mineral oil, 4.22 parts of a 93% sulfuric acid solution, 54 parts of butanol, 2 parts of a 50% aqueous sodium hydroxide solution, 2.22 parts of Isonox 133 and 15 parts of diatomaceous earth.

EXAMPLE B-7

Esterify the interpolymer of Example A-7 by the same procedure as B-4. Use 278 parts of Alfol 1218, 49 parts of Alfol 810, 136 parts of a mineral oil, 4.21 parts of a 93% sulfuric acid solution, 54 parts butanol, 1.14 parts of a 50% aqueous sodium hydroxide solution, 2.08 parts of Isonox 133 and 16 parts of diatomaceous earth.

EXAMPLE B-8

Esterify the interpolymer of Example A-8 by the same procedure as B-4. Use 257 parts of Alfol 1218, 45 parts of Alfol 810, 130 parts of a mineral oil, 4.2 parts of a 93% sulfuric acid solution, 54 parts butanol, 1.21 parts of a 50% aqueous sodium hydroxide solution, 2 parts of Isonox 133 and 16 parts of diatomaceous earth.

EXAMPLE B-9

Esterify the interpolymer of Example A-9 by the procedure utilized in Example B-4. Use 278 parts of Alfol 1218, 49 parts of Alfol 810, 362 parts of a mineral oil, 4.21 parts of a 93% sulfuric acid solution, 54 parts butanol, 1.28 parts of a 50% aqueous sodium hydroxide solution, 1.72 parts of Isonox 133 and 20 parts of diatomaceous earth.

EXAMPLE B-10

Esterify the interpolymer of Example A-10 utilizing the procedure described in Example B-4. Use 257 parts of Alfol 1218, 45.2 parts of Alfol 810, 134 parts of a mineral oil, 54 parts butanol, 2.05 parts of a 50% aqueous sodium hydroxide solution, 2.08 parts of Isonox 133 and 16 parts of diatomaceous earth. Replace the sulfuric acid of Example B-4 with 5.46 parts of a 70% solution of methyl sulfonic acid.

EXAMPLE B-11

Esterify 212 parts of the interpolymer of Example A-11 according to the procedure as described in Example B-4, except use 5.46 parts of a 70% solution of methyl sulfonic acid in place of sulfuric acid. Use 278 parts of Alfol 1218, 49 parts of Alfol 810, 136 parts of a mineral oil, 54 parts of butanol, 2 parts of a 50% aqueous sodium hydroxide solution, 2.08 parts of Isonox 133 and 16 parts of diatomaceous earth.

EXAMPLE B-12

Esterify the interpolymer of Example A-12 by the same procedure as B-4. Use 257 parts of Alfol 1218, 45 parts of Alfol 810, 130 parts of a mineral oil, 4.2 parts of a 3% sulfuric acid solution, 54 parts butanol, 1.21 parts of a 50% aqueous sodium hydroxide solution, 2 parts of Isonox 133 and 16 parts of diatomaceous earth.

EXAMPLE B-13

Esterify the interpolymer of Example A-13 by the procedure utilized in Example B-4. Use 278 parts of Alfol 218, 49 parts of Alfol 810, 362 parts of a mineral oil, 4.21 parts of a 93% sulfuric acid solution, 54 parts butanol, 1.28 parts of a 50% aqueous sodium hydroxide solution, 1.72 parts of Isonox 133 and 20 parts of diatomaceous earth.

EXAMPLE B-14

Esterify the interpolymer of Example A-14 utilizing the procedure described in Example B-4. Use 257 parts of Alfol 1218, 45.2 parts of Alfol 810, 134 parts of a mineral oil, 54 parts butanol, 2.05 parts of a 50% aqueous sodium hydroxide solution, 2.08 parts of Isonox 133 and 16 parts of diatomaceous earth. Replace the sulfuric acid of Example B-4 with 5.46 parts of a 70% solution of methyl sulfonic acid.

EXAMPLE B-15

Esterify 212 parts of the interpolymer of Example A-15 according to the procedure as described in Example B-4, except use 5.46 parts of a 70% solution of methyl sulfonic acid in place of sulfuric acid. Use 278 parts of Alfol 1218, 49 parts of Alfol 810, 136 parts of a mineral oil, 54 parts of butanol, 2 parts of a 50% aqueous sodium hydroxide solution, 2.08 parts of Isonox 133 and 16 parts of diatomaceous earth.

The instant invention is shown and described herein in what is considered to be the most practical, and the preferred, embodiments. It is recognized, however, that departures may be made therefrom which are within the scope of the invention, and that obvious modifications will occur to one skilled in the art upon reading this disclosure.

What is claimed is:

1. An oil soluble, nitrogen-free mixed ester of a carboxy-containing interpolymer prepared by reacting an alpha, beta-unsaturated dicarboxylic anhydride, acid or derivative with a vinyl aromatic monomer, wherein the interpolymer has an inherent viscosity of from about 0.05 to about 1.5, said ester having pendant polar groups consisting of (A) and (B) wherein:
    (A) is a relatively high molecular weight carboxylic ester group from the reaction of a carboxy group with an alkyl alcohol having about 8 to about 24 aliphatic carbon atoms; and
    (B) is a relatively low molecular weight carboxylic ester group from the reaction of a carboxy group with an alkyl alcohol having no more than seven aliphatic carbon atoms;
    wherein the molar ratio of (A):(B) is (1–10):(1).

2. The nitrogen-free ester of claim 1, where said molar ratio of (A):(B) is (2–9):(1).

3. The nitrogen-free ester of claim 1, wherein said carboxy-containing interpolymer has from about 0 to about 10 percent titratable acidity.

4. The nitrogen-free ester of claim 3, wherein said carboxy-containing interpolymer is substantially free of titratable acidity.

5. The nitrogen-free ester of claim 3, wherein said carboxy-containing interpolymer has an inherent viscosity from about 0.10 to about 0.8.

6. The nitrogen-free ester of claim 4, wherein said carboxy-containing interpolymer has an inherent viscosity from about 0.10 to about 0.25.

7. The nitrogen-free ester of claim 1, wherein the carboxy-containing interpolymer is a terpolymer of a vinyl aromatic monomer, an alpha, beta unsaturated dicarboxylic anhydride and a vinyl monomer selected from the group consisting of acrylic acid and esters, methacrylic acid and esters, vinyl carboxylates, vinyl ethers, alpha methyl styrene, alpha olefins, isobutylene and diisobutylene.

8. The nitrogen-free ester of claim 7, wherein the vinyl aromatic monomer is styrene.

9. The nitrogen-free ester of claim 7, wherein the alpha, beta unsaturated dicarboxylic anhydride is maleic anhydride.

10. The nitrogen-free ester of claim 7, wherein the vinyl monomer is selected from the group consisting of methacrylic acids and esters, and alpha methyl styrene.

11. The nitrogen-free ester of claim 10, wherein the vinyl monomer is alpha methyl styrene.

12. The nitrogen-free ester of claim 7, where the molar ratio of vinyl aromatic monomer to alpha, beta-unsaturated dicarboxylic anhydride is about one molar proportion to about one molar proportion to less than about 0.3 molar proportion.

13. The nitrogen-free ester of claim 10, wherein the carboxy-containing interpolymer is a terpolymer of about one molar proportion of styrene, about one molar proportion of maleic anhydride and less than about 0.15 molar proportion of a vinyl monomer selected from the group consisting of alpha methyl styrene, and methacrylic acid and esters.

* * * * *